United States Patent

Malay

[11] Patent Number: 5,830,594
[45] Date of Patent: Nov. 3, 1998

[54] GALVANIC CELL HAVING A RESEALABLE VENT CLOSURE

[75] Inventor: Manuel R. Malay, Brunswick, Ohio

[73] Assignee: Eveready Battery Company, Inc., St. Louis, Mo.

[21] Appl. No.: 526,188

[22] Filed: Sep. 11, 1995

[51] Int. Cl.[6] .............................. H01M 2/12; H01M 2/08
[52] U.S. Cl. .............................. 429/53; 429/54; 429/174; 429/175
[58] Field of Search .............................. 429/53, 54, 174, 429/175; 29/623.2

[56] References Cited

U.S. PATENT DOCUMENTS 3,923,548  12/1975  Bell et al. .................................. 429/54
5,455,124  10/1995  Schollenberger .......................... 429/53

Primary Examiner—Kathryn L. Gorgos
Assistant Examiner—Edna Wong
Attorney, Agent, or Firm—Robert W. Welsh; S. Allan Fraser

[57] ABSTRACT

A resealable vent closure for an electrochemical cell comprising a disk seal having a first upstanding wall to define an opening to accommodate a current collector rod of a cell and having vent grooves disposed in the first wall, and having a second upstanding peripheral wall with vent channels and said second wall being crimped between a cover for the cell and the top edge of a container containing the active components of the cell to thereby produce a sealed cell that is resealable.

13 Claims, 2 Drawing Sheets

GALVANIC CELL HAVING A RESEALABLE VENT CLOSURE

FIELD OF THE INVENTION

This invention relates to a sealed galvanic dry cell, and more particularly to a low pressure resealable vent for releasing excessive gas pressure from inside the dry cell. The invention also relates to a method for making galvanic dry cells having resealable vent closures.

BACKGROUND OF THE INVENTION

Galvanic cells may generate large quantities of gas under certain conditions during use. Since these cells are required to be tightly sealed at all times in order to prevent loss of electrolyte by leakage, high internal gas pressures may develop. Such pressures may cause leakage, bulging or possible explosion of the cell if not properly vented. If a vent valve is employed, it must be resealable in order to avoid drying out of the electrolyte over the life of the cell and to prevent ingress of oxygen from the atmosphere which can cause wasteful corrosion of the anode.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

Another type of resealable pressure relief vent valve that has been tried is that disclosed and claimed in U.S. Pat. No. 3,293,081. This resealable vent valve basically includes an annular seal gasket such as an O-ring which is maintained in sealing position around the periphery of the vent orifice by means of an arc shaped resilient member or spring. The resilient member or spring is designed to yield and permit radial movement of the seal gasket so as to momentarily break the seal and allow the passage of gas through the vent orifice when a predetermined high internal gas pressure is reached inside the cell.

Another type of resealable vent for dry cells consists of a metal ball overlying a vent opening and biased into sealing engagement around the vent opening by means of a coil spring. The vent opens to release gas from inside the cell when the internal gas pressure reaches a predetermined limit as set by the coil spring. Once the internal gas pressure has been relieved, the coil spring causes the ball to reseat and to reseal the vent.

Another type of resealable vent is disclosed in U.S. Pat. No. 3,415,690. In this vent, a flat elastomeric seal gasket overlies the vent opening and is retained in place by a resilient terminal cap on the top of the cell. This vent operates in basically the same manner as the vents previously described.

In U.S. Pat. No. 3,664,878, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the build-up of a predetermined high internal gas pressure inside the container so as to momentarily break the seal and allow gas to escape through the vent orifice.

U.S. Pat. No. 4,052,533 disclosed a galvanic dry cell having a resealable subseal comprising a cup-shaped flapper vent valve having an opening at its center for receiving and contacting the cell's current collector rod and a peripheral edge segment contacting and conforming to the inner wall of the cell's container and adapted for deflecting upwardly thereby providing a resealable vent path at the valve-container interface.

U.S. Pat. No. 4,063,902 discloses a galvanic cell, and a method for making it, having a resealable vent closure consisting of a resilient elastomeric sponge gasket disposed and compressed between the cover of the cell and the upper wall of the cell's container and designed such that gas buildup within the cell in the range of about 5 to 75 psi will vent along the cover-gasket interface and/or container-gasket interface.

A major problem encountered with resealable pressure relief vent valves of the types just described is that they are bulky and/or difficult to incorporate into the cell assembly. Furthermore, these pressure relief vent valves are expensive to manufacture. In addition, some of the prior art resealable vents as exemplified by the foregoing patents are not suitable for low pressure venting.

It is, therefore, an important object of this invention to provide a compact and economical low pressure resealable vent for use in a galvanic dry cell.

Still another object of this invention is to provide a resealable vent for galvanic dry cells which requires the very minimum number of parts and which is, therefore, easy to assemble and inexpensive to manufacture.

Another object of this invention is to provide a resealable vent that is adaptable to various diameters of drawn or extruded cell containers.

Another object of this invention is directed to a method for making a galvanic cell having a low pressure resealable vent closure.

The foregoing and additional objects will become more fully apparent from the following description and the accompanying drawings.

SUMMARY OF THE INVENTION

The invention relates to an electrochemical cell comprising a metal anode container having an opening and having a cathode mix therein, a current collector rod protruding through said open end of said anode container and a closure for said open end; said closure comprising a disk having a top surface and having a first projecting upstanding wall defining an opening in the disk and a second upstanding wall defining a peripheral wall with an inside surface abutting the top surface of the disk; said first wall having an inner surface defining the opening in the disk and at least one groove disposed on said inner surface and terminating within the inner surface of the first wall; at least one channel disposed in the top surface of the disk and extending in the inside surface of the second wall; said current collector rod adapted to be in interference fitting relationship with the first wall; and said peripheral wall is secured to the open end of the anode container to provide a sealed cell so that upon the development of a predetermined gas pressure within the cell, the first wall will flex to permit gas to escape through the groove in the inner surface of the first wall and then the gas will vent through the channel in the top surface of the disk and through the channel on the inside surface of the second wall; thereby permitting venting of the gas from the interior of the cell.

In the preferred embodiment of the invention, the disk would have at least two spaced apart grooves and more preferably four equally spaced apart grooves in the inner surface of the first wall. In the preferred embodiment of the invention, the disk would have at least two spaced apart channels and more preferably six equally spaced apart channels in the top surface of the disk and extending into the peripheral wall of the disk. The disk or seal could be made of a molded plastic such as polypropylene. In the preferred embodiment the disk is circular with an inner circular hub and an outer circular vertical wall. The inner circular hub has a central vertical opening sized to fit the current collector rod snugly and has four venting grooves located at the lower section of the inner wall of the hub. In the preferred embodiment of the invention, the top surface of the disk has a circular groove provided around the hub to enhance the ability of the top portion of the first wall to flex and thereby relieve internal gas buildup. Also the top surface of the disk contains six equally spaced radial horizontal channels that extend vertically along the inner surface of the peripheral wall. The six channels provide vent paths between a closure cap of the cell and the inner surface of the peripheral wall. The edge of the peripheral wall is provided with an outer flange that abuts the edge of the container to align the edge of the container so as to facilitate the turning and crimping of the container onto the peripheral wall of the disk and above the closure cap of the cell to provide a seal for the cell. Any gas build up in the cell can be vented between the disk and the current collector rod by the four grooves on the wall defining the opening for the current collector rod. The gas is then vented through the six channels in the disk as discussed above.

The invention also relates to a method for making a galvanic dry cell having a low pressure resealable vent closure which comprises the steps:

(a) placing within a metal anode container a separator to contact the anode, a cathode depolarizer mix so as to be disposed within said separator, a current collector rod so as to be partially embedded within the cathode depolarizer mix such that the rod projects above the top surface of the depolarizer mix and an electrolyte;

(b) preparing a disk with a top surface and a first projecting upstanding wall defining an opening adapted for accommodating the current collector rod and forming at least one groove in the inner surface of the first wall, forming an upstanding peripheral wall with at least one channel in its inner surface that extends to the top surface of the disk;

(c) assembling a cover over the disk within the upstanding wall of the disk and having the cover-disk assembly placed into the container so that the current collector rod is located in the opening in the disk and the peripheral wall is disposed adjacent the inner wall of the container; and (d) crimping the top edge portion of the container over the peripheral wall of the disk above the cover to provide a sealed cell.

Preferably a sealant such as silicon could be applied on the top of the current collector rod and/or a sealant such as asphalt could be applied on the container's inner surface at the interface of the disk and container.

Preferably the outer diameter of the cover for use in the above method should be equal to the inner diameter of the container minus about 1.8 to 2.2 and preferably about 2 times the thickness of the peripheral wall of the disk so that in the fully assembled cell, the peripheral wall would be compressed between the periphery of the cover and the top edge portion of the container.

Commercial conventional cylindrical cells suitable for this invention, such as Leclanche dry cells, are of two main types. In the "pasted" cell, the cathode depolarizer mix is impact or pressure molded to form a cylindrical bobbin containing a current collector rod. This bobbin is later inserted into a cylindrical anode container together with a flowable separator paste or colloidal mass which is cooked or otherwise gelled to form an immobilized separator member between the metal container and the mix bobbin. In the construction of bobbin type cells, a substantial amount of the total cell electrolyte is added by way of the separator paste.

In the "lined" cell, the separator is applied to the inside wall of the metal container either as an adherent film or coating or as an inserted layer of coated paper. The wet cathode mix is extruded or rammed into position to fill a major portion of the lined container and then the current collector rod is inserted directly into the rammed mix or into a hole made by a piercing rod. In this construction, virtually all of the cell electrolyte is added by way of the wet mix.

The present invention will become more apparent from the following description thereof when considered together with the accompanying drawings which are set forth as being exemplary of embodiments of the present invention and are not intended, in any way, to be limitative thereof and wherein:

A BRIEF DESCRIPTIPON OF THE DRAWINGS

Figure 1:
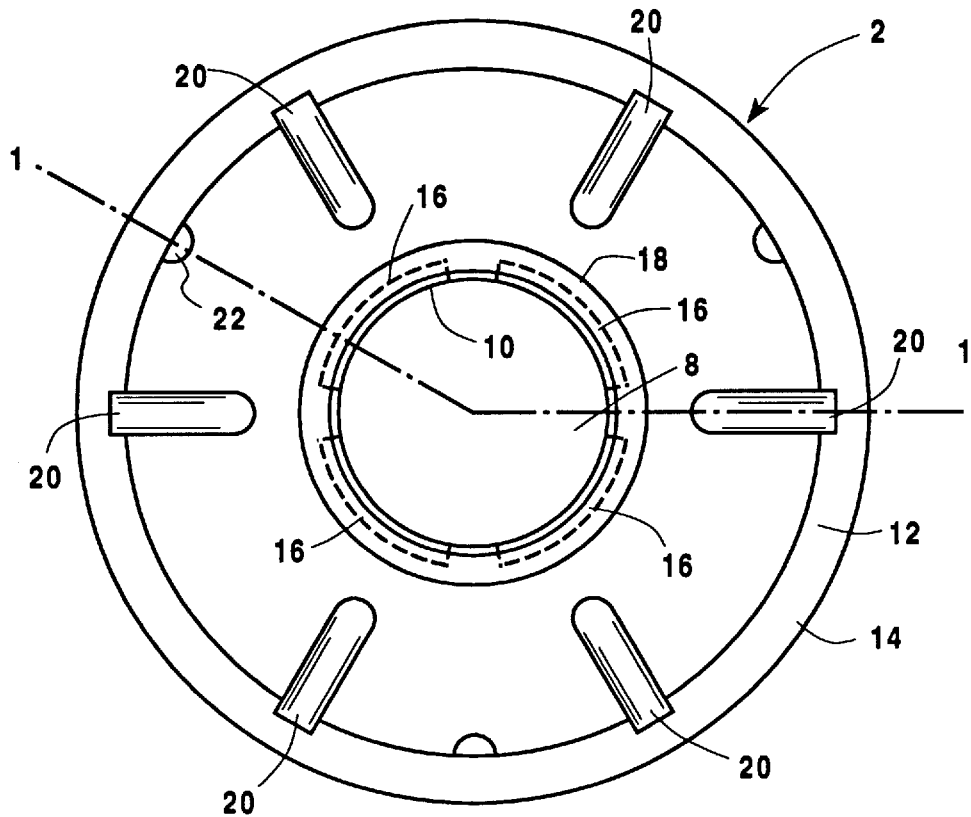
FIG. 1 is a top view of a disk seal for use in this invention.
Figure 2:
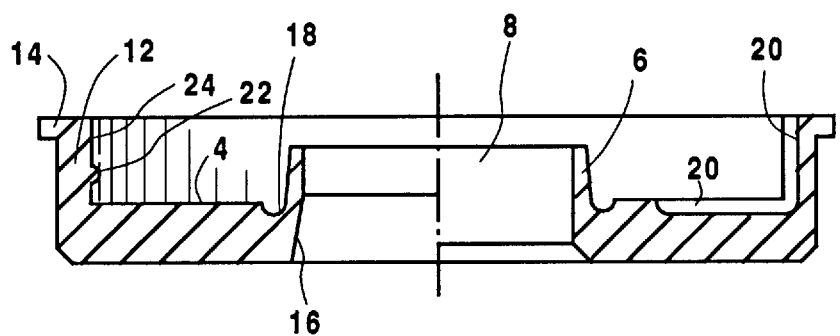
FIG. 2 is a sectional elevation view of the disk in FIG. 1 taken through line 1—1.

Referring in detail to FIGS. 1 and 2, there is shown a disk seal 2 for an electrochemical cell. The disk seal comprises a top surface 4 having a center upstanding wall 6 having an opening 8 defined by the inner surface 10 of the wall 6. Four grooves 16 are equally spaced apart on the inner surface 10 of wall 6. These four grooves are designed to accommodate the venting of gases from within the cell. Disk seal 2 has an upstanding peripheral wall 12 that terminates with a radial flange 14. Six radial channels 20 are equally spaced apart in the top surface 4 of disk seal 2 and extend into the inner surface of the peripheral wall 12. The operation of the grooves 16 and channels 20 will be discussed below with FIGS. 3 and 4. An annular groove 18 is disposed on the inner area of the top surface 4 of disk seal 2 adjacent upstanding wall 6. This annular groove 18 is designed to facilitate the flexing of the upstanding wall 6 to release gas buildup within the cell. The peripheral wall 12 terminates with a flange 14 which is designed to abut the edge of the open end of a container for the cell which will facilitate the crimping of the edge of the container upon the peripheral wall 12 of disk seal 2. A projected bead 22 is provided at the inner surface 24 of wall 12 to be used as a snap means to retain the cover of the cell in alignment as will be discussed below.

Figure 3:
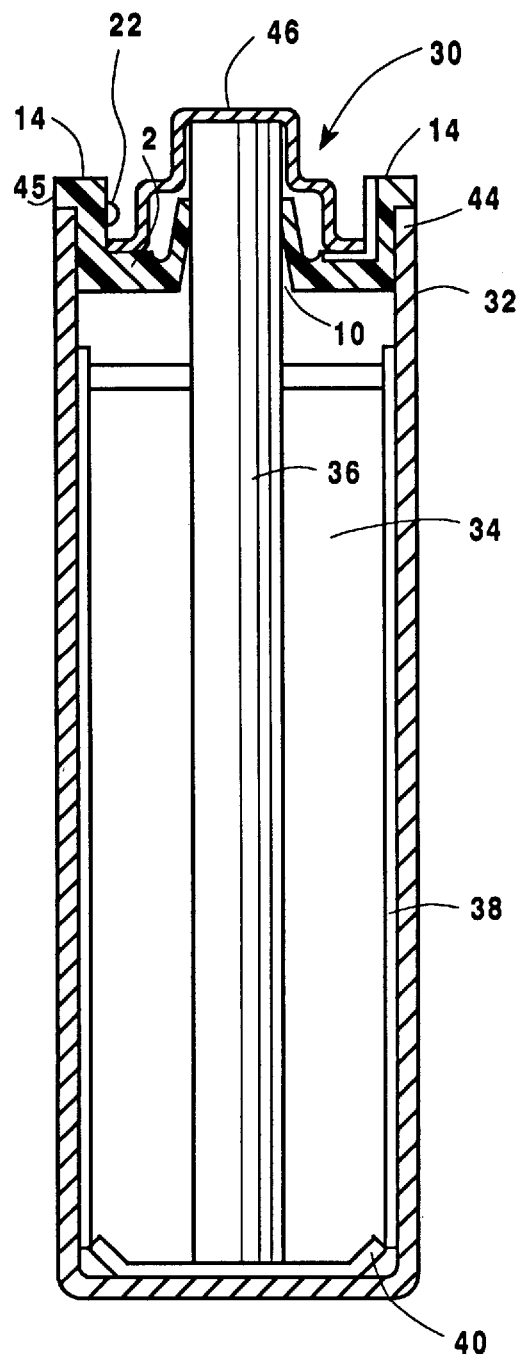
FIG. 3 is a sectional elevation taken through a cell embodiment of the present invention before the edge of the container is crimped above the cover of the cell.

FIG. 3 shows a partially assembled cell 30 including a cylindrical container 32 which is made of an electrochemically consumable metal such as zinc which serves as the anode for the cell. The cell container 32 includes therein a cathode depolarizer mix cake 34 containing, for example, manganese dioxide, a conductive material, such as carbon black and an electrolyte. The cathode depolarizer mix cake 34 could be molded around a current collector rod 36 or the cathode depolarizer mix 34 could be fed into container 32 as a wet mix containing virtually all of the cell's electrolyte and then the current collector rod 36 forced down into the center of the depolarizer mix 34. The current collector rod 36 could be a carbon rod impregnated with a wax or an organic resin to render it both liquid and gas impermeable. Whether the depolarizer mix is molded into a bobbin type structure in a separate operation prior to cell assembly or fed directly into the container 32 and packed therein, the current collector rod 36 is positioned such that its upper end protrudes through the open end of the container 32. A separator 38 surrounds the cathode depolarizer mix 34 and separates it from the inner side wall of the container 32 while a bottom cup separator 40 separates the depolarizer mix 34 from the bottom inner surface of the container 32. The separator may be a thin film separator e.g., a thin bibulous paper coated with a paste. Above the depolarizer mix is shown the usual air space 42 to accommodate any liquid spew that may be formed on discharge of the cell.

Figure 4:
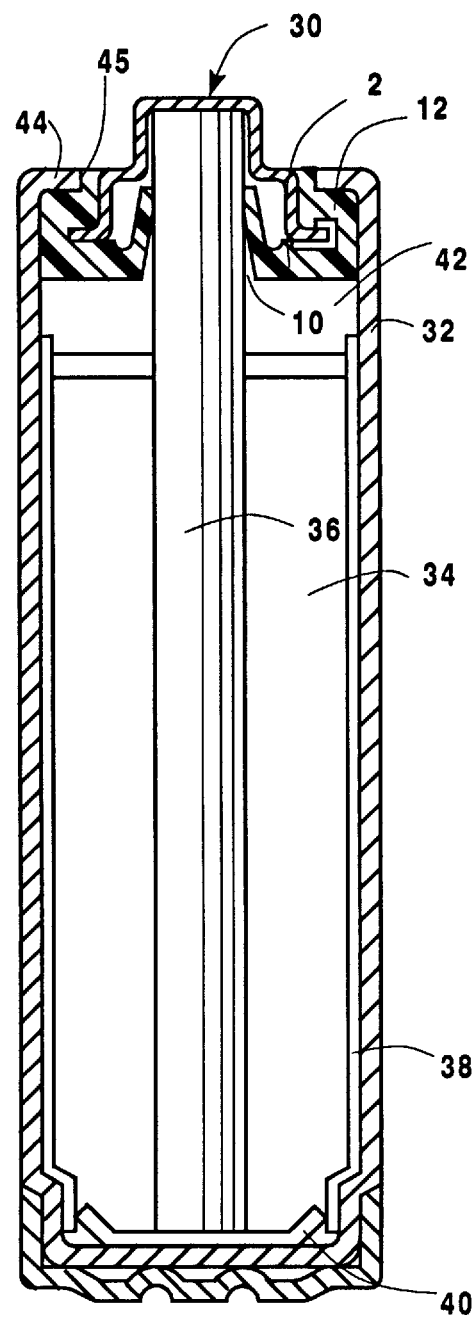
FIG. 4 is a sectional elevation taken through a fully assembled cell embodiment of the present invention.

The disk seal 2 of FIGS. 1 and 2 is shown assembled in container 32 in FIG. 3, in which the current collector rod 36 is inserted into the opening 8 of disk 2 and the flange 14 is seated at the edge 44 of container 32. The current collector rod 36 has a snug fit within opening 8 in disk 2. A closure cap or cover 46 is shown placed on current collector rod 36 and in contact with the top surface 4 of disk 2. A snap member 22 maintains and aligns cover 46 within disk 2. FIG. 4 shows the same cell as in FIG. 3 with the same reference numbers except that the edge 44 of container 32 is crimped onto and into peripheral wall 12 and onto cover 46. The crimping of the edge 44 of container 32 provides an effective resealable seal for the cell. In storage and/or use of the cell, gas will accumulate and when a predetermined gas level is reached, the gas buildup will exert pressure on disk 2 and onto the grooves 16 disposed around the wall 6. The pressure of the gas will reach a level where the gas will exert a force at the grooves 16 and deflect the wall 6 away from the rod 36 to provide a vent path between the disk 2 and rod 36. The annular groove 18 will facilitate the flexing of the wall 6 away from rod 36. The gas venting between wall 6 and rod 36 will be directed to flow into grooves 16 where the gas will exit the channels 20 to the atmosphere. Once the pressure of gas is reduced within the cell, the wall 6 of disk 2 will reseal against rod 36.

The design of the disk 2 will provide an effective static (long time, low pressure) seal that is easy to make and assemble in conventional electrochemical cells. The disk seals of this invention will operate to release the pressure of gas within the cell and then will reseal to seal the cell.

It is to be understood that although the present invention has been described with reference to particular details thereof, it is not intended that those details shall be constructed as limiting the scope of this invention.

What is claimed:

1. An electrochemical cell comprising a metal anode container having an opening and having a cathode mix therein, a current collector rod protruding through said opening of said anode container, a cap contacting the current collector rod, and a closure for said opening; said closure comprising a disk having a top surface, a first projecting upstanding wall defining an opening in the disk and a second upstanding wall defining a peripheral wall with an inside surface abutting the top surface of the disk; said first wall having an inner surface, said inner surface having at least one groove terminating within the inner surface of the first wall; at least one channel disposed in the top surface of the disk and extending in the inside surface of the second wall; said current collector rod adapted to be in interference fitting relationship with the first wall; said peripheral wall secured to the opening of the anode container; and said cap comprising a radially extending flange disposed between the top surface of the disk and the peripheral wall of the disk.

2. The electrochemical cell of claim 1 wherein said inner surface of the first wall has four spaced apart grooves.

3. The electrochemical cell of claim 1 wherein said top surface of the disk has six spaced apart channels.

4. The electrochemical cell of claim 3 wherein said inner surface of the first wall has four spaced apart grooves.

5. The electrochemical cell of claim 1 wherein an annular groove is disposed in the top surface of the disk adjacent to the first wall.

6. The electrochemical cell of claim 5 wherein said inner surface of the first wall has four spaced apart grooves.

7. The electrochemical cell of claim 6 wherein said top surface of the disk has six spaced apart channels.

8. The electrochemical cell of claim 1 wherein the peripheral wall terminates with an outer flange that is disposed on the edge of the wall of the container at the open end.

9. The electrochemical cell of claim 8 wherein said inner surface of the first wall has four spaced apart grooves.

10. The electrochemical cell of claim 8 wherein said top surface of the disk has six spaced apart channels.

11. The electrochemical cell of claim 10 wherein said inner surface of the first wall has four spaced apart grooves.

12. The electrochemical cell of claim 11 wherein an annular groove is disposed in the top surface of the disk adjacent the first wall.

13. The electrochemical cell of claim 8 wherein an annular groove is disposed in the top surface of the disk adjacent the first wall.

\* \* \* \* \*